United States Patent
Von Beuningen et al.

(10) Patent No.: US 9,658,814 B2
(45) Date of Patent: May 23, 2017

(54) DISPLAY OF DYNAMIC SAFETY-RELEVANT THREE-DIMENSIONAL CONTENTS ON A DISPLAY DEVICE

(71) Applicant: Bayerische Motoren Werke Aktiengesellschaft, Munich (DE)

(72) Inventors: Sven Von Beuningen, Munich (DE); Timo Lotterbach, Neufahrn (DE); Violin Yanev, Munich (DE); Serhat Eser Erdem, Munich (DE); Jonathan Conrad, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/808,628

(22) Filed: Jul. 24, 2015

(65) Prior Publication Data
US 2016/0027205 A1    Jan. 28, 2016

(30) Foreign Application Priority Data

Jul. 25, 2014   (DE) .................. 10 2014 214 667

(51) Int. Cl.
   *G06F 3/14*    (2006.01)
   *G09G 5/36*    (2006.01)

(52) U.S. Cl.
   CPC ............. *G06F 3/14* (2013.01); *G09G 5/36* (2013.01); *G09G 2330/08* (2013.01);
   (Continued)

(58) Field of Classification Search
   CPC . G06T 2207/10016; G06T 2207/30168; G06T 7/0002
   (Continued)

(56) References Cited

U.S. PATENT DOCUMENTS 8,286,196 B2   10/2012  Munshi et al.
8,913,846 B2 *  12/2014  Charvet ................ G06T 7/0004
                                                      382/218
(Continued)

FOREIGN PATENT DOCUMENTS

DE   10 2013 201 377 A1   7/2014
EP      0 856 792 A2      8/1998
(Continued)

OTHER PUBLICATIONS

German Search Report dated Oct. 24, 2014, with English translation (Twelve (12) pages).
(Continued)

*Primary Examiner* — Thomas Lett
(74) *Attorney, Agent, or Firm* — Crowell & Moring LLP

(57) ABSTRACT

In order to represent an item of three-dimensional graphical information on a display device, in particular of a vehicle, a method calculates a first item of two-dimensional graphical information for at least one first area of the display device from the three-dimensional information using a graphics processor, The display device represents the three-dimensional information in a two-dimensional manner. A second item of two-dimensional graphical information is calculated for at least one second area of the display device from the three-dimensional information using a universal processor. The second area is part of the first area. The method checks whether the first and second items of two-dimensional graphical information have a degree of correspondence which is higher than a threshold value, and outputs the first item of two-dimensional information on the display device if the first and second items of two-dimensional graphical information have a degree of correspondence which is higher than the threshold value.

14 Claims, 1 Drawing Sheet

(52) U.S. Cl.
CPC ..... *G09G 2330/12* (2013.01); *G09G 2340/12* (2013.01); *G09G 2360/06* (2013.01); *G09G 2380/10* (2013.01)

(58) Field of Classification Search
USPC .......................................................... 345/426
See application file for complete search history.

(56) References Cited

U.S. PATENT DOCUMENTS

| | | | |
|---|---|---|---|
| 8,977,491 B1* | 3/2015 | McCusker | G01S 13/95 |
| | | | 342/26 B |
| 2004/0158742 A1 | 8/2004 | Srinivasan et al. | |
| 2013/0090787 A1* | 4/2013 | Ryu | G01S 13/94 |
| | | | 701/3 |
| 2014/0085324 A1 | 3/2014 | Charvet et al. | |
| 2015/0206299 A1* | 7/2015 | Charvet | G06T 7/0004 |
| | | | 345/589 |

FOREIGN PATENT DOCUMENTS

| WO | WO 02/103292 A1 | 12/2002 |
|---|---|---|
| WO | WO 2005/124685 A1 | 12/2005 |

OTHER PUBLICATIONS

Hauswiesner, et al. "Multi-Frame Rate Volume Rendering", Eurographics Symposium on Parallel Graphics and Visualization (2010), pp. 1-8, http://web.archive.org/web/20121030021317/http://data.icg.tugraz.at/~dieter/publications/Schmalstieg_186.pdf, (Eight (8) pages).

* cited by examiner

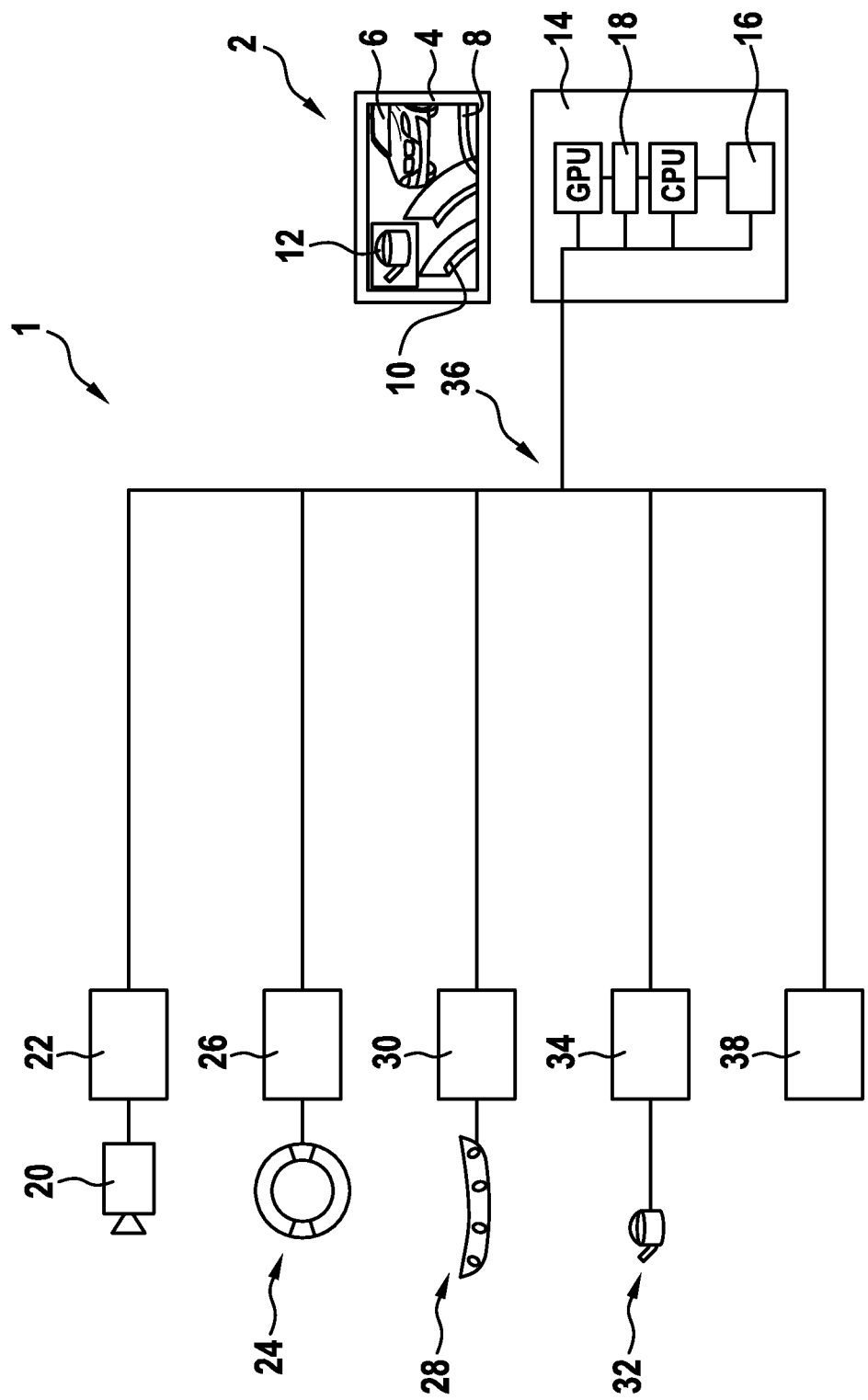

DISPLAY OF DYNAMIC SAFETY-RELEVANT THREE-DIMENSIONAL CONTENTS ON A DISPLAY DEVICE

CROSS REFERENCE TO RELATED APPLICATION

This application claims priority under 35 U.S.C. §119 from German Patent Application No. 10 2014 214 667.4, filed Jul. 25, 2014, the entire disclosure of which is herein expressly incorporated by reference.

BACKGROUND AND SUMMARY OF THE INVENTION

The invention relates to a method and a system for displaying dynamic safety-relevant three-dimensional contents on a display device, in particular on a display device of a vehicle.

Vehicles include microprocessor-controlled systems on which applications which generate three-dimensional (3D) image data are executed. To this end, in the prior art, each application builds a separate so-called scene model that describes a three-dimensional scene. So-called renderers are used to represent the three-dimensional scene on a display unit. Said systems can likewise be executed on a microprocessor, in particular on a computer. They are substantially used to process the three-dimensional image data of the three-dimensional scene such that they are adapted for representation on the display unit.

During a rendering process, a two-dimensional image can be calculated from a three-dimensional scene, for example. During the conversion of three-dimensional image data which describe a vector graphic, it is possible in the course of the rendering process, for example, to convert the vector graphic of an object into an image-point-wise pixel representation of the object in a two-dimensional (2D) computer graphic.

A three-dimensional renderer can generate, for example, a separate two-dimensional graphic from each individual three-dimensional scene. A control component, a so-called layer manager, can be used to produce a total image for the display on a display unit by superimposing different two-dimensional graphics. Here, the individual two-dimensional images are placed one above the other according to a fixed sequence in the form of planes. Contents from a higher plane can here cover contents from a lower plane. For the topmost plane, the visibility of its contents can be guaranteed.

Owing to such an architecture or data processing based on planes, three-dimensional contents of different applications can be displayed on a common display. It is also possible to ensure here that contents of a safety-relevant application are represented on the display, that is to say that they are not covered by contents of other, non-safety-relevant applications.

Safety aspects are an important consideration in displays in a vehicle. Two-dimensional contents are currently predominantly represented on a display device in a vehicle. In order to ensure that these contents are displayed correctly, they are stored in a special hardware area and are displayed above all other contents. Safety-relevant displays are, for example, a warning of an excessively low oil level, a warning of an incorrect tire pressure and/or a warning of restricted functionality of the brake.

The representation of three-dimensional contents causes interaction between the contents which include, for example, lighting effects, reflection, shadowing and the like. These contents cannot be statically stored like the two-dimensional contents but rather must be calculated at the run time. A graphics processor (GPU) is needed to efficiently calculate the representation of the three-dimensional contents on a display device which represents a two-dimensional image. A graphics processor is generally not suitable for representing safety-relevant contents since they are not designed and certified for that purpose.

U.S. Pat. No. 8,286,196 discloses that programs can be alternatively executed by a central processor unit (CPU) or by a graphics processor (GPU).

DE 10 2013 201 377.9, owned by the Applicant of the present application and filed on an earlier date, discloses a method and an image processing system which at least partially superimposes three-dimensional image scenes and forms a three-dimensional overall scene. Three-dimensional output image data are also rendered. The subject matter of DE 10 2013 201 377.9 is hereby incorporated by reference.

The invention is based on the object of providing an improved method and system for displaying three-dimensional contents on a display device of a vehicle which represents three-dimensional contents in a two-dimensional manner.

The object of the invention is achieved by a method and a display system according to embodiments of the invention.

The method according to the invention for representing an item of three-dimensional graphical information on a display device of a vehicle comprises the act of calculating a first item of two-dimensional graphical information for at least one first area of the display device from the three-dimensional information using a graphics processor, the display device representing the three-dimensional information in a two-dimensional manner. According to the invention, a second item of two-dimensional graphical information is calculated for at least one second area of the display device from the three-dimensional information using a universal processor, the second area being part of the first area. A check is carried out in order to determine whether the first and second items of two-dimensional graphical information have a degree of correspondence which is higher than a threshold value. The first item of two-dimensional information is output on the display device if the first and second items of two-dimensional graphical information have a degree of correspondence which is higher than the threshold value.

The operation of generating the first item of two-dimensional graphical information and the operation of generating the second item of two-dimensional graphical information can be carried out using rendering. The universal processor may be a central processor unit (CPU). The first and second areas may be of the same size. The universal processor checks the method of operation of the graphics processor. If the degree of correspondence is lower than a threshold value, it is possible to output a warning indicating that the contents have been manipulated or there is a malfunction of a program.

The act of checking whether the first and second items of two-dimensional graphical information have a degree of correspondence which is higher than a threshold value can be carried out by a comparison device which comprises neither the graphics processor nor the universal processor. This makes it possible to further reduce the risk of manipulation. However, it is also possible for the comparison device to be implemented by use of software which runs on the universal processor.

The term "a universal processor" should be interpreted in such a manner that there is at least one universal processor.

The term "a graphics processor" should also be interpreted in such a manner that there is at least one graphics processor. The at least one graphics processor and the at least one universal processor need not be situated in the same calculation device, for example a control unit or the like. They may be distributed over the vehicle and may be situated in different calculation devices which are connected via a network. The method consequently comprises the act of calculating the first item of two-dimensional graphical information using a plurality of graphics processors. The method also comprises the act of calculating the second item of two-dimensional graphical information using a plurality of universal processors.

The reliability of the displayed contents is achieved by way of the redundancy. The likelihood of the results from two completely different hardware and software architectures providing the same error is sufficiently low. The graphics processor has a high degree of parallelization when calculating the data in the shader units, while the universal processor has a very low degree of parallelization in comparison with the graphics processor. The software of the two processor types differs considerably as the operations of the graphics processor are controlled by a driver provided by the manufacturer and the calculations on the universal processor are carried out using separately developed software.

The at least one universal processor can calculate the second item of two-dimensional graphical information in a secured mode and/or security mode in which the data are protected against manipulation.

The method may determine a safety-relevant area of the three-dimensional information and may stipulate the second area in such a manner that it comprises the safety-relevant area. A check can then be carried out in order to determine whether the first and second items of two-dimensional graphical information have a degree of correspondence which is higher than the threshold value. This increases the efficiency since only the safety-relevant area is checked.

The first and second items of two-dimensional information may include a lighting effect, reflection and/or shadowing which are calculated on the basis of the three-dimensional data. As a result, the three-dimensional representations affect the observer like a natural scenario.

The three-dimensional information can be calculated at the run time. It is undesirable for the three-dimensional representations to be permanently stored in a hardware memory since no individual scenarios can be created as a result. The three-dimensional information can be generated by a plurality of processes running on the same calculation device, for example a computer, a control unit or the like. However, it is also possible for the three-dimensional information to be generated by a plurality of processes running on different calculation devices, for example computers, control devices or the like. The calculation devices may be connected via a network and/or a bus.

The three-dimensional information may have a first item of three-dimensional partial information which is assigned a first priority and is represented in front of or above a second item of three-dimensional partial information which is assigned a second priority which is lower than the first priority. A plurality of distributed processes may represent information on the display device. For example, it is possible for a first process to represent the image from a rear-view camera on the display device. A second process may represent the predicted trip trajectory on the basis of the steering angle. A third process may evaluate the information from the distance sensors and may indicate a possible risk of collision. This information may be represented above one another on the display device.

If it is determined, while representing the image from the rear-view camera, the predicted trajectory and the distance information, that the oil level is too low, the information indicating that the engine should be immediately switched off and the oil level should be checked is displayed above the image from the rear-view camera. In this example, the oil level information has the highest priority, the distance information has the second-highest priority, the predicted trajectory has the third-highest priority and the image from the rear-view camera has the lowest priority.

The three-dimensional information may include an effect description. An effect description describes a three-dimensional graphic to be represented in an abstract manner. The effect description includes a platform-independent description of the manner in which a graphics processor is intended to display the individual graphical elements. In terms of content, the effect description is substantially identical to a so-called shader code but is not dependent on a particular graphics API (for example OpenGL or DirectX). The description additionally includes the configuration of the graphics processor which goes beyond the shader code, for example the blend mode, the depth test, etc.

The data format for this effect description is a tree structure. This resembles an abstract syntax tree, as is also used by compilers. The effect description corresponds substantially to the result after a parser has processed the source code.

The operation of generating the two-dimensional information may also include time-slice rendering. The problem often exists that contents of different dynamics are situated in a scene, for example a speedometer needle which requires a very high degree of responsiveness and a navigation scene which is less time-critical. It would be possible either to render the navigation and the speedometer needle with a very large number of frames or to render both with a smaller number of frames. The practice of rendering the navigation with the number of frames required for the speedometer needle usually overwhelms the hardware. In contrast, the practice of rendering the speedometer needle with the small number of frames for the navigation causes non-fluid animation of the speedometer needle. So-called time-slice rendering is used in such constellations. In this case, the speedometer needle is rendered using a high frame rate (for example 60 fps) and a portion of the navigation is concomitantly rendered in each frame but is not displayed. Instead, an older image is used for the navigation. If it is assumed that 20 fps are intended to be achieved for the navigation, only one third of the navigation scene is concomitantly calculated in each frame. A complete frame for the navigation is then also available after three frames for the speedometer needle. In this case, the speedometer needle can be blended into the new navigation image and a complete image is obtained again. This technique makes it possible to better distribute the load.

The invention also relates to a computer program product which, when loaded into a computer having a processor and a memory, carries out the steps of the method described above. The computer may be a control unit.

The invention also relates to a display system which is designed to represent an item of three-dimensional graphical information on a display device in a vehicle. The display system comprises a display device which represents an item of three-dimensional information in a two-dimensional manner, at least one graphics processor, at least one universal processor, a coordination device and a comparison device.

The coordination device instructs the graphics processor to calculate a first item of two-dimensional graphical information for at least one first area of the display device from the three-dimensional information. The coordination device instructs the universal processor to calculate a second item of two-dimensional graphical information for at least one second area of the display device from the three-dimensional information. The coordination device instructs the comparison device to check whether the first and second items of two-dimensional graphical information have a degree of correspondence which is higher than a threshold value.

The at least one graphics processor, the at least one universal processor, the control device and the comparison device may be situated in a calculation device or may be distributed among a plurality of calculation devices. The control device and/or the comparison device may be implemented by way of the universal processor or by way of dedicated hardware or a dedicated device. After it has been determined that the first and second items of two-dimensional graphical information have a degree of correspondence which is higher than the threshold value, the first item of two-dimensional graphical information can be output on the display device.

The display system can be developed in the manner described above with respect to the method.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic diagram showing a vehicle system having a display system according to an embodiment of the invention.

DETAILED DESCRIPTION OF THE DRAWINGS

FIG. 1 illustrates a vehicle system 1 having a display system 2. The vehicle system 1 includes a rear-view camera 20 which is connected to a rear-view camera control device 22. The vehicle system 1 also includes a steering wheel 24 which is connected to a steering angle detection device 26. The vehicle system 1 also includes at least one distance sensor 28, which may be arranged on a bumper of the vehicle for example, and a distance detection device 30 connected to the distance sensor 28. The vehicle system 1 also includes an oil level sensor 32 which is connected to an oil monitoring device 34. The vehicle system 1 also includes a central control device 38 which can monitor and/or control the method of operation of the rear-view camera control device 22, the steering angle detection device 26, the distance detection device 30, the oil monitoring device 34 and a display control device 14.

The rear-view camera control device 22, the steering angle detection device 26, the distance detection device 30, the oil monitoring device 34, the central control device 38 and the display control device 14 may be connected to one another via a network or bus 36. The display control device 14 outputs the contents transmitted to it on a display device 4, for example a flat screen. The display control device 14 can also output the contents transmitted to it on a plurality of display devices (not shown), for example a combination instrument which is in the direct field of view of the driver behind the steering wheel, by means of a representation projected onto the windscreen (head-up display) and a screen above the center tunnel.

In the illustration shown in FIG. 1, the rear-view camera control device 22 transmits the image recorded by the camera 20, via the network 36, to the display control device 14 which represents the camera image on the display device 4 in the form of a three-dimensional scenario 6. It goes without saying that the camera 20 may be a stereo camera.

The steering angle detection device 26 determines a predicted trajectory and transmits a three-dimensional silhouette of the predicted path of the vehicle to the display control device 14 via the network 36. The display control device 14 represents the predicted trajectory in the form of a three-dimensional silhouette 10 above the three-dimensional camera image 6, in which case, although the silhouette 10 of the predicted trajectory is represented above the camera image 6, it is nevertheless represented in a semitransparent manner, with the result that the camera image 6 is still visible. The representation of the steering angle detection device has a higher priority than the representation of the rear-view camera control device, with the result that the silhouette 10 of the predicted trajectory is represented above the camera image 6.

The distance detection device 30 uses the data determined by the at least one distance sensor 28, for example an ultrasonic sensor, to determine the distance to obstacles and transmits the three-dimensional distance data to the display control device 14 via the network 36. Since the distance data 8 have a higher priority than the silhouette 10 of the predicted trajectory, the distance data 8 are represented above the camera image 6 and the silhouette 10 of the predicted trajectory.

The oil monitoring device checks whether the oil level determined by the oil level sensor 32 is lower than a threshold value. If the oil level is lower than a threshold value, the oil monitoring device 34 transmits an oil level warning to the display device 14 via the network 36. The display device 14 represents the oil level warning 12 above the camera image 6, the distance data 8 and the silhouette 10 of the predicted trajectory since the oil level warning 12 has the highest priority.

The method of operation of the display control device 14 is described below. The display control device 14 includes a universal processor CPU, a graphics processor GPU, a coordination device 16 and a comparison device 18. The coordination device 16 controls the method of operation of the universal processor CPU, the graphics processor GPU and the comparison device 18. The contents represented on the display device 4, for example the camera image 6, the predicted trajectory 10, the distance information 8 and the oil level information 12, are calculated using the graphics processor GPU and are represented. Currently available graphics processors do not have a so-called secure mode in which manipulation can be avoided and/or program crashes can be intercepted. The coordination device 16 instructs the universal processor CPU to likewise calculate safety-relevant areas of the contents displayed on the display device 4 and, in particular, to calculate them in a security mode. In the embodiment illustrated in FIG. 1, safety-relevant areas are the oil level warning 12 and the distance information 8. Consequently, the coordination device 16 instructs the universal processor CPU to likewise calculate the graphic for the distance information 8 and the graphic for the oil level information 12.

After both the graphics processor GPU and the universal processor CPU have calculated the graphic of the distance information 8 and the graphic of the oil level information 12, the coordination device 16 instructs the comparison device 18 to compare the graphic of the distance information 8 determined by the graphics processor GPU with the graphic of the distance information 8 determined by the universal processor CPU. The coordination device 16 also instructs the comparison device 18 to compare the graphic of the oil level information 12 calculated by the graphics processor GPU with the graphic of the oil level information calculated by the universal processor CPU. If the graphics determined by the graphics processor GPU and by the universal processor CPU have a difference which is higher than a threshold value, the graphic calculated by the graphics processor GPU is output on the screen 4.

The simplest procedure for checking the correspondence is a complete pixel-based comparison of both calculation results or rendering results. This procedure is possible since only a comparatively small number of pixels needs to be checked. Since it is possible for the results to have a minimal difference between the graphics processor and the universal processor (for example on account of rounding discrepancies), it is also contemplated to use a threshold value. As a further optimization, only parts of the safety-relevant contents can be compared, for example every second line. This can then be changed from frame to frame in order to completely test the contents.

In order to simplify the test for identity, a checksum of the two partial images can be calculated. In this case, only the check of the checksums needs to be specifically secured. This can be carried out using so-called coded processing. In this case, the input parameters are calculated using prime numbers which can be removed again after the test. This makes it possible to reduce the likelihood of an error during the comparison to a very low level.

If the graphic calculated by the graphics processor GPU and the graphic calculated by the universal processor CPU have a degree of correspondence which is lower than a threshold value, an alarm is output and the graphic calculated by the universal processor CPU is output on the display device 4.

The rear-view camera control device 22, the steering angle detection device 26, the distance detection device 30 and the oil monitoring device 34 may generate three-dimensional data. The three-dimensional data may comprise an effect description, for example a vector graphic. The graphics processor GPU and the universal processor CPU use the three-dimensional graphical data to calculate two-dimensional pixel data which are represented on the two-dimensional display device 4, which can also be referred to as "rendering". The coordination device 16 and/or the comparison device 18 may be formed by the universal processor CPU.

The display control device 14 may comprise a plurality of graphics processors GPU and/or a plurality of universal processors CPU. The at least one graphics processor GPU and the at least one universal processor CPU need not necessarily be arranged in the same calculation device, for example the display control device 14. Rather, the at least one graphics processor GPU and the at least one universal processor CPU may be situated in different components distributed in the vehicle system 1.

It is also contemplated for computing power to be requested, if necessary, from a universal processor 16 which has a low workload at the time at which the safety-relevant graphic is checked. Such a selection of a suitable universal processor CPU can be carried out by the central control device 38.

The invention has the advantage that safety-relevant graphics can be calculated in a redundant manner without requiring changes to existing graphics processors GPU.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for representing an item of three-dimensional graphical information on a display device, the method comprising the acts of:
    calculating a first item of two-dimensional graphical information for at least one first area of the display device from the three-dimensional graphical information using a graphics processor, the display device representing the three-dimensional graphical information in a two-dimensional manner;
    calculating a second item of two-dimensional graphical information for at least one second area of the display device from the three-dimensional graphical information using a universal processor, the second area being part of the first area;
    checking whether the first and second items of two-dimensional graphical information have a degree of correspondence which is higher than a threshold value;
    outputting the first item of two-dimensional graphical information on the display device only if the first and second items of two-dimensional graphical information have a degree of correspondence which is higher than the threshold value; and
    outputting at least one of the second item of two-dimensional graphical information and a warning indicator on the display device if the first and second items of two-dimensional graphical information have a degree of correspondence which is lower than the threshold value,
    wherein the first item of two dimensional graphical information is not output on the display device when the first and second items of two-dimensional graphical information have a degree of correspondence which is lower than the threshold value.

2. The method according to claim 1, wherein the act of checking whether the first and second items of two-dimensional graphical information have a degree of correspondence which is higher than the threshold value is carried out by a comparison device which comprises neither the graphics processor nor the universal processor.

3. The method according to claim 1, wherein the act of calculating the first item of two-dimensional graphical information comprises the act of calculating the first item using a plurality of graphics processors.

4. The method according to claim 1, wherein the act of calculating the second item of two-dimensional graphical information comprises the act of calculating the second item using a plurality of universal processors.

5. The method according to claim 3, wherein the act of calculating the second item of two-dimensional graphical information comprises the act of calculating the second item using a plurality of universal processors.

6. The method according to claim 1, wherein the universal processor calculates the second item of two-dimensional graphical information in a secure mode in which processed data are protected from manipulation.

7. The method according to claim 1, further comprising the acts of:
  determining a safety-relevant area of the three-dimensional graphical information; and
  stipulating the second area such that the second area comprises the safety-relevant area before carrying out the act of checking whether the first and second items of two-dimensional graphical information have the degree of correspondence which is higher than the threshold value.

8. The method according to claim 1, wherein the first and second items of two-dimensional graphical information comprise a lighting effect, reflection, and/or shadowing which are calculated from the three-dimensional graphical information.

9. The method according to claim 8, wherein the three-dimensional graphical information are calculated at a run time.

10. The method according to claim 9, wherein:
  the three-dimensional graphical information has a first item of three-dimensional partial information which is assigned a first priority and is represented in front of or above a second item of three-dimensional partial information which is assigned a second priority, the second priority being lower than the first priority.

11. The method according to claim 9, wherein the three-dimensional graphical information is generated by a plurality of processes running on different calculation devices.

12. The method according to claim 1, wherein
  the three-dimensional graphical information comprises an effect descriptor, and/or
  calculating the two-dimensional graphical information is carried out by time-slice rendering.

13. A display system that represents an item of three-dimensional graphical information, the system comprising:
  a display device that represents the item of three-dimensional information in a two-dimensional manner;
  at least one graphics processor;
  at least one universal processor;
  a coordination device; and
  a comparison device, wherein:
  the coordination device instructs the graphics processor to calculate a first item of two-dimensional graphical information for at least one first area of the display device from the three-dimensional information,
  the coordination device instructs the universal processor to calculate a second item of two-dimensional graphical information for at least one second area of the display device from the three-dimensional information,
  the coordination device instructs the comparison device to check whether the first and second items of two-dimensional graphical information have a degree of correspondence which is higher than a threshold value,
  wherein the first item of two-dimensional graphic information is output on the display device only if the first and second items of two-dimensional graphical information have a degree of correspondence which is higher than the threshold value, and
  wherein at least one of the second item of two-dimensional graphical information and a warning indicator is output on the display device if the first and second items of two-dimensional graphical information have a degree of correspondence which is lower than the threshold value,
  wherein the first item of two dimensional graphical information is not output on the display device when the first and second items of two-dimensional graphical information have a degree of correspondence which is lower than the threshold value.

14. A computer program product comprising a non-transitory computer readable medium having stored thereon program code segments that, when executed:
  calculate a first item of two-dimensional graphical information for at least one first area of the display device from the three-dimensional graphical information using a graphics processor, the display device representing the three-dimensional graphical information in a two-dimensional manner;
  calculate a second item of two-dimensional graphical information for at least one second area of the display device from the three-dimensional graphical information using a universal processor, the second area being part of the first area;
  check whether the first and second items of two-dimensional graphical information have a degree of correspondence which is higher than a threshold value;
  output the first item of two-dimensional graphical information on the display device only if the first and second items of two-dimensional graphical information have a degree of correspondence which is higher than the threshold value; and
  output at least one of the second item of two-dimensional graphical information on the display device if the first and second items of two-dimensional graphical information have a degree of correspondence which is lower than the threshold value,
  wherein the first item of two dimensional graphical information is not output on the display device when the first and second items of two-dimensional graphical information have a degree of correspondence which is lower than the threshold value.

* * * * *